United States Patent [19]

Soga et al.

[11] Patent Number: 5,436,656
[45] Date of Patent: Jul. 25, 1995

[54] DIGITAL ELECTRONIC STILL-VIDEO CAMERA AND METHOD OF CONTROLLING SAME

[75] Inventors: Takashi Soga; Ryuji Kawaguchi; Izumi Miyake, all of Asaka, Japan

[73] Assignee: Fuji Photo Film Co., Ltd., Kanagawa, Japan

[21] Appl. No.: 118,677

[22] Filed: Sep. 10, 1993

[30] Foreign Application Priority Data

Sep. 14, 1992 [JP] Japan .................................. 4-269172

[51] Int. Cl.⁶ ............................................ H04N 5/225
[52] U.S. Cl. ................................... 348/220; 348/221; 348/354
[58] Field of Search ............... 348/254, 674, 224, 222, 348/220, 221, 354; H04N 5/225, 5/202

[56] References Cited

U.S. PATENT DOCUMENTS

| | | | |
|---|---|---|---|
| 4,969,045 | 11/1990 | Haruki et al. | 348/254 |
| 5,008,739 | 4/1991 | D'Luna et al. | 348/254 |
| 5,027,214 | 6/1991 | Fujimori | 348/233 |
| 5,089,890 | 2/1992 | Takayama | 348/674 |
| 5,091,787 | 2/1992 | Watanabe et al. | 348/233 |
| 5,162,914 | 11/1992 | Takahashi et al. | 348/311 |

FOREIGN PATENT DOCUMENTS 0219370  8/1990  Japan .......................... H04N 5/202

Primary Examiner—Michael T. Razavi
Assistant Examiner—Tuan V. Ho

[57] ABSTRACT

An analog/digital converting circuit necessary for recording processing is also used when exposure control is performed employing digital image data. A gamma corrector circuit 10 capable of being changed over between a gamma-correction characteristic and a linearly proportional characteristic in response to depression of a two-stage shutter release button is provided. When exposure control is carried out, changeover of the gamma-corrector circuit 10 is controlled in such a manner that the input/output characteristic of the circuit will be a linearly proportional characteristic. When exposure control is performed, a b terminal of a changeover switch 14 is connected to the A/D converting circuit 13 so that a photometric value is calculated using circuits 15, 16, and 17. When processing for recording image data is executed, changeover of the gamma-corrector circuit 10 is controlled is such a manner that the output signal thereof takes on the value of the input signal raised to the 0.45 power, and an a terminal of the changeover switch 14 connected to the A/D conversion circuit 13. The image data is recorded on a memory card 40 using circuits 31, 32, 33 and 34.

9 Claims, 8 Drawing Sheets

Fig. 6

| FEED (μm) OF IMAGE PICK-UP LENS | SUMMED DATA |
|---|---|
| 0 | |
| 10 | |
| 20 | |
| 30 | |
| 40 | |
| 50 | |

DIGITAL ELECTRONIC STILL-VIDEO CAMERA AND METHOD OF CONTROLLING SAME

BACKGROUND OF THE INVENTION

1. Field of the Invention

This invention relates to a digital electronic still-video camera for recording digital image data representing a subject on a recording medium such as a memory card. The invention further relates to a method of controlling such a camera.

2. Description of the Related Art

Photometry is required in order to determine exposure conditions in a digital electronic still-video camera having an automatic exposure (so-called "AE") function. Photometry can be performed in a variety of ways. One method is to dispose a photometric element on the front side of the digital electronic still-video camera. Though this method is a simple one in terms of construction, an intrinsic problem which arises is that the area in which light is measured does not coincide with the area photographed. This problem becomes particularly pronounced in a case where the field of view is changed using a zoom lens. In order to solve this problem, it is necessary to change the photometric area of the photometric element in operative association with the zoom lens of the photographic system. This necessitates an elaborate mechanism.

Another method (referred to as "TTL photometry") that is available involves incorporating the photometric element in the image pick-up optical system and making the photometric area coincide with the photographic area. With this method, the image pick-up optical system requires such devices as a beam splitter and elements for changing the optical path. This leads to a larger optical system and to a decrease in sensitivity caused by a decrease in the transmittance of light. In a case where a mirror is used, problems arise in terms of durability and reliability.

Accordingly, in the case of a digital electronic still-video camera having a solid-state electronic image sensing device (such as a CCD) in which a video signal representing the image of a subject is obtained and converted into digital image data, consideration has been given to a method in which a photometric value is found by integrating the digital image data over an appropriate photometric area. This approach is advantageous in that the photographic area and photometric area coincide completely, there is no increase in size and it is unnecessary to provide extra elements for the optical system. In addition, such variations as average photometry, partial photometry and split photometry become possible by subjecting the digital image data to data processing. Since this makes it possible to set exposure conditions corresponding to a variety of photographic environments, a broader range of applications is achieved.

Digital electronic still-video cameras further have various automatic focusing functions (so-called "AF" functions). These include a function in which an incident light image is preliminarily captured by a solid-state electronic image sensing device such as a CCD, the video image thus obtained is converted into digital image data and focusing control is performed using this digital image data.

However, in a case where exposure control and focusing control are performed using digital image data, circuitry for this purpose is necessary and it is difficult to make the digital electronic still-video camera small in size and light in weight. In a digital electronic still-video camera, it is necessary to convert the analog video signal outputted by the CCD into digital image data. However, when an analog/digital converting circuit is provided for each of recording processing, exposure-control processing and focusing-control processing, a small-size, light-weight camera cannot be achieved.

SUMMARY OF THE INVENTION

An object of the present invention is to make it possible to make shared use of an analog/digital converting circuit necessary for recording processing, exposure-control processing and focusing-control processing in a case where exposure control and focusing control are performed using digital image data.

According to the present invention, the foregoing object is attained by providing a digital electronic still-video camera having an image pick-up optical system which includes a solid-state electronic image sensing device for converting an incident light image into an analog video signal and outputting the analog video signal, said system comprising: a gamma-corrector circuit, which is capable of being changed over between a gamma correction characteristic and a proportional characteristic, for outputting a signal obtained by making whichever of these characteristics is selected act in dependence upon an applied control signal, upon the analog video signal outputted by the solid-state electronic image sensing device; an analog/digital converting circuit for converting the analog video signal, which is outputted by the gamma-corrector circuit; into digital image data, recording means for subjecting the digital image data, which is outputted by the analog/digital converting circuit, to recording processing and then recording the digital image data on a recording medium; photometric-value calculating means for extracting luminance-related data from the digital image data outputted by the analog/digital converting circuit and calculating a photometric value based upon the luminance-related data extracted, and changeover control means for applying a control signal to the gamma-corrector circuit in such a manner that the gamma-correction characteristic is made to act in the gamma-corrector circuit when the digital image data is recorded on the recording medium and the proportional characteristic is made to act in the gamma-corrector circuit when photometric processing of a subject is executed.

According to the present invention, a method of controlling a digital electronic still-video camera having an image pick-up optical system which includes a solid-state electronic image sensing device for converting an incident light image into an analog video signal and outputting the analog video signal, as well as a gamma-corrector circuit for applying a gamma correction to the analog video signal outputted by the solid-state electronic image sensing device, the method comprising a step of enabling the gamma-corrector circuit to be changed over between a gamma-correction characteristic and a proportional characteristic, a step of controlling changeover of the gamma-corrector circuit in such a manner that the characteristic of the gamma-corrector circuit is changed over to the gamma-correction characteristic when digital image data is recorded on the recording medium, converting the analog video signal that is gamma-corrected by the gamma-correction characteristic into digital image data using an analog/digital converting circuit, subjecting this digital image data to recording processing and then recording the digital image data on the recording medium, and a step of controlling changeover of the gamma-corrector circuit in such a manner that the characteristic of the gamma-corrector circuit is changed over to the proportional characteristic when photometric processing of a subject is executed, converting the analog video signal outputted by the gamma-corrector circuit into digital image data using the analog/digital converting circuit, extracting luminance-related data from this digital image data, and calculating a photometric value based upon the luminance-related data extracted.

In accordance with the present invention, the gamma-corrector circuit has both the gamma-correction characteristic and the proportional characteristic. When recording is performed, the gamma-corrector circuit employs the gamma-correction characteristic so that the analog video signal is subjected to a gamma correction. When exposure control is performed, the gamma-corrector circuit employs the proportional characteristic so that no gamma correction is applied to the analog video signal.

Since the analog video signal is not subjected to the gamma correction when exposure control is carried out, appropriate exposure control is achieved even though this control is performed upon converting the analog video signal into the digital image data.

Since the characteristic of the gamma-corrector circuit is changed when recording processing is executed and when exposure-control processing is executed, the analog/digital converting circuit can be provided in back of the gamma-corrector circuit and the output data from the analog/digital converting circuit can be applied to the recording circuit or photometric-value calculating circuit. Accordingly, the analog/digital converting circuit can be used for both recording processing and photometric-value calculation processing. This makes it possible to reduce the amount of circuitry.

Further, the present invention provides a digital electronic still-video camera having an image pick up optical system which includes an image pick-up lens and a solid-state electronic image sensing device for converting a light image incident through the image pick-up lens into an analog video signal and outputting the analog video signal, comprising: a gamma-corrector circuit, which is capable of being changed over between a gamma correction characteristic and a proportional characteristic, for outputting a signal obtained by making whichever of these characteristics is selected, in dependence upon an applied control signal, act upon the analog video signal outputted by the solid-state electronic image sensing device; an analog/digital converting circuit for converting the analog video signal, which is outputted by the gamma-corrector circuit, into digital image data, recording means for subjecting the digital image data, which is outputted by the analog/digital converting circuit, to recording processing and then recording the digital image data on a recording medium; focusing-control means for extracting high-frequency-component data for focusing control from the digital image data outputted by the analog/digital converting circuit and performing focusing control of the image pick-up lens based upon the high-frequency-component data extracted; and changeover control means for applying a control signal to the gamma-corrector circuit in such a manner that the gamma-correction characteristic is made to act in the gamma-corrector circuit when the digital image data is recorded on the recording medium and the proportional characteristic is made to act in the gamma-corrector circuit when focusing control of the image pick-up lens is performed.

According to the present invention, a method of controlling a digital electronic still-video camera having an image pick-up optical system which includes an image pick-up lens and a solid-state electronic image sensing device for converting a light image incident through the image pick-up lens into an analog video signal and outputting the analog video signal, is disclosed. Also disclosed is a gamma-corrector circuit for applying a gamma correction to the analog video signal outputted by the solid-state electronic image sensing device, and a method comprising a step of enabling the gamma-corrector circuit to be changed over between a gamma-correction characteristic and a proportional characteristic, a step of controlling changeover of the gamma-corrector circuit in such a manner that the characteristic of the gamma-corrector circuit is changed over to the gamma-correction characteristic when digital image data is recorded on the recording medium, converting the analog video signal gamma-corrected by the gamma-correction characteristic into digital image data using an analog/digital converting circuit, subjecting this digital image data to recording processing and then recording the digital image data on the recording medium; and a step of controlling changeover of the gamma-corrector circuit in,such a manner that the characteristic of the gamma-corrector circuit is changed over to the proportional characteristic when focusing control of the image pick-up lens is performed, converting the analog video signal outputted by the gamma-corrector circuit into digital image data using the analog/digital converting circuit, extracting high-frequency-component data for focusing control from this digital image data, and performing the focusing control of the image pick-up lens based upon the high-frequency-component data extracted.

In accordance also with this aspect of the present invention, a gamma-corrector circuit has both the gamma-correction characteristic and the proportional characteristic. When recording is performed, the gamma-corrector circuit employs the gamma-correction characteristic so that the analog video signal is subjected to a gamma correction. When processing for exposure control is performed, the gamma-corrector circuit employs the proportional characteristic so that no gamma correction is applied to the analog video signal.

Since the analog video signal is not subjected to the gamma correction when focusing control is carried out, appropriate focusing control is achieved even though this control is performed upon converting the analog video signal into digital image data.

Since the characteristic of the gamma-corrector circuit is changed to one characteristic when recording processing is executed and to another characteristic when exposure-control processing is executed, the analog/digital converting circuit can be provided in back of the gamma-corrector circuit and the output data from the analog/digital converting circuit can be applied to the recording circuit or processing circuit for focusing control. Accordingly, the analog/digital converting circuit can be used for both recording processing and focusing processing. This makes it possible to reduce the amount of circuitry.

If the analog/digital conversion is performed before the gamma correction is applied, an analog/digital converting circuit having a large number of bits is required owing to the wide dynamic range. However, since the dynamic range is narrowed when the gamma correction is applied, it is possible to perform the analog/digital conversion using an analog/digital converting circuit having the ordinary number of bits.

Further, when recording and the processing for exposure control or the processing for focusing control are carried out with regard to the result of the conversion into the digital image data, a large part of the processing can be implemented by software.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a diagram showing storage areas of addition data for rangefinding;

DESCRIPTION OF THE PREFERRED EMBODIMENT

An embodiment in which the present invention is applied to a digital still-video camera will be described in detail with reference to the drawings.

Figure 1:
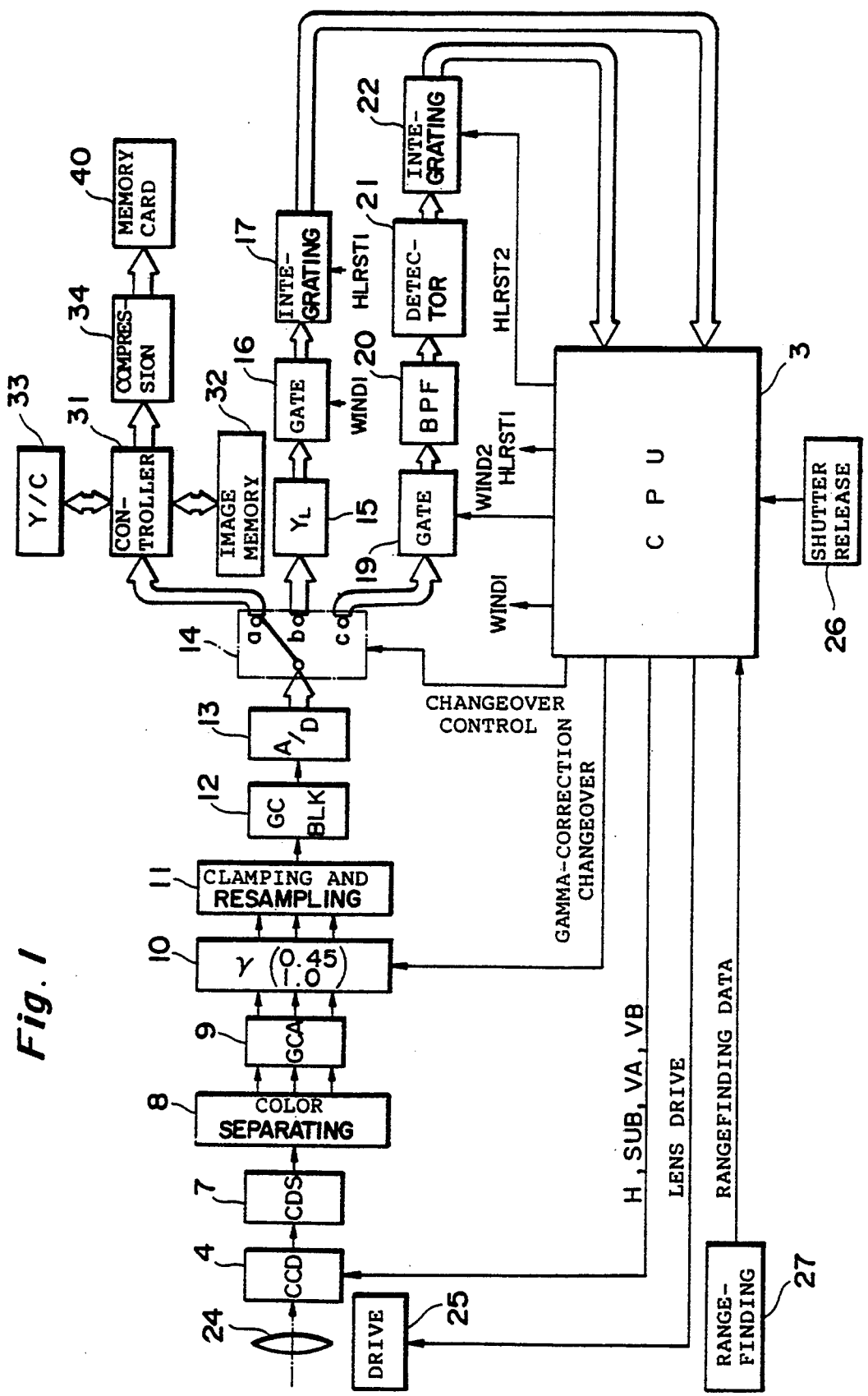
FIG. 1 is a block diagram illustrating the electrical configuration of an digital still-video camera according to an embodiment of the present invention.

FIG. 1 is a block diagram illustrating the electrical configuration of the digital still-video camera according to this embodiment of the invention.

The camera has an image pick-up optical system including a image pick-up lens 24, a diaphragm (not shown) and a CCD 4 serving as a solid-state electronic image sensing device (i.e., an image sensor). Though a mechanical shutter may be provided if necessary, in general the shutter function is achieved by an electronic shutter realized by control of the CCD 4. The image pick-up lens 24, which forms an image of a subject on the CCD 4, is moved and positioned at a focused point by a lens drive 25 controlled by the CPU 3.

In this embodiment, a rangefinding sensor 27 is provided for the purpose of preliminary rangefinding, and the CPU 3 is provided with rangefinding data from the rangefinding sensor 27. On the basis of the rangefinding data from the rangefinding sensor 27, the CPU 3 positions the image pick-up lens 24 at an initial position in the vicinity of the focused point via the lens drive 25.

The digital still-video camera is provided with a shutter release button 26 of two-stage stroke type. A signal indicating depression of the shutter release button 26 is applied to the CPU 3.

Exposure control and focusing control are carried out in response to depression of the shutter release button 26 through the first stage of the stroke. Preliminary imaging is performed after general focusing control (positioning of the lens 24 at the initial position) that is based upon the preliminary rangefinding performed by the rangefinding sensor 27. The video signal obtained from the CCD 4 by this preliminary imaging is utilized to calculate a photometric value, control exposure and carry out highly precise focusing control. The details of this highly precise exposure control and focusing control will be set forth later.

Actual photography is performed by pressing the shutter release button 26 through the second stage of the stroke.

A timing-signal generating circuit accompanying the CPU 3 generates horizontal transfer pulses H for driving a horizontal transfer line of the CCD 4, substrate pulses SUB for sweeping out unnecessary charge, A-field vertical transfer pulses VA and B-field vertical transfer pulses VB.

The horizontal transfer pulses H, substrate pulses SUB, A-field vertical transfer pulses VA and the B-field vertical transfer pulses VB are applied to the CCD 4.

Interlaced photography is performed in the CCD 4 by virtue of the substrate pulses SUB, the A-field vertical transfer pulses VA, the B-field vertical transfer pulses VB and the horizontal transfer pulses H, video signals (color-sequential signals of GRGB) of A and B fields are produced alternately field by field, and these signals are read out in successive fashion. Drive of the CCD 4 (namely image pick-up and readout of the video signal) is performed at least at the time of actual photography and for the sake of highly precise photometric processing and focusing processing that precede actual photography.

The video signals of the A and B fields representing the image of the subject outputted by the CCD 4 are applied to a color separating circuit 8 through a correlated double-sampling circuit (CDS) 7. The color separating circuit 8 separates the input video signal into color signals of the three primary colors G (green), R (red) and B (blue).

The color signals G. R, B are applied to a variable-gain (gain-controlled) amplifier circuit (hereinafter referred to as a "GCA") 9. Though one block is shown as the GCA 9 in FIG. 1, in actuality a GCA is provided for each of the R G and B signals. The GCA 9 corrects for a disparity in optical transmittance between colors in color filters provided in the CCD 4 (this correction shall be referred to as a "color-filter disparity correction" hereinafter) and performs a white-balance adjustment, after which the resulting signals are applied to a gamma-corrector circuit 10. This circuit 9 is for performing focusing control (described later) in a highly precise manner and will be discussed in detail below. Though it is sufficient to perform at least the color-filter disparity correction for the sake of focusing control, it is even more preferable to carry out the white-balance adjustment in addition to this correction.

The voltage applied to the grid of a color display tube and the light-emission output are related in that the light-emission output is proportional to the grid voltage raised to the 2.2 power. For this reason, in a case where the video signal outputted by the CCD 4 is converted into digital image data and the data is recorded on a memory card, the image is not faithfully reproduced even though the digital image data is read out of the memory card at the time of reproduction, converted into an analog video signal and then applied to the color display tube. At the time of recording, therefore, the video signal is subjected to a gamma-correction characteristic that is the inverse of the above-mentioned characteristic of the color display tube. The gamma-corrector circuit 10 is provided for this purpose.

The gamma-corrector circuit 10 is capable of being changed over between a gamma-correction characteristic in which the value of output voltage is the value of input voltage raised to the 0.45 power (this is the inverse characteristic mentioned above), and the linearly proportional characteristic. On the basis of a control signal provided by the CPU 3, changeover of the gamma-correction circuit 10 is controlled in such a manner that the gamma-correction characteristic, wherein the value of output voltage is the value of input voltage raised to the 0.45 power, is selected when the digital image data is recorded on the memory card 40, and the linearly proportional characteristic is selected when exposure control or focusing control is carried out.

The gamma-corrector circuit 10 may be constructed from of a gamma-corrector circuit for subjecting the input signal to a gamma correction and a non-inverting circuit for passing the input signal as is, wherein at least the input sides or output sides of these circuits would be capable of being changed over. The output from either of the circuits constructing the gamma-corrector circuit 10 would be adopted as the output of the gamma-corrector circuit 10. Further, it would suffice to provide an amplifier circuit for amplifying and then outputting the input signal instead of a circuit for passing the input signal as is. The changeover need not necessarily be performed on both the input and output sides but only on one of these sides.

When exposure control or focusing control is carried out, the linearly proportional characteristic is selected so that no gamma-correction processing is applied to the video signal. As a result, highly precise exposure control and focusing control are carried out.

The output signal from the gamma-corrector circuit 10 is applied to a clamping and resampling circuit 11.

The clamping and resampling circuit 11 clamps the three color signals R, G, B and converts them back into the color-sequential signals GRGB . . . , which agree with the arrangement of the color filters in the CCD 4, by resampling. The color-sequential signals enter a gain-controlled blanking circuit 12. The latter amplifies the color-sequential signals to a suitable level in order for these signals to be recorded and also applies a blanking signal to them. The output signal of the circuit 12 is applied to an analog/digital converting circuit 13 so as to be converted into digital image data. The digital image data is applied to a changeover switch 14.

The changeover switch 14 has a, b and c terminals as its output terminals, any one of which is rendered conductive relative to a terminal on the input side in conformity with the changeover control signal outputted by the CPU 3. The a terminal is rendered conductive when the digital image data is recorded on a memory card 40, the b terminal when exposure control is performed and the c terminal when focusing control is performed.

Precision photometric processing (exposure control) and focusing control are carried out prior to actual photography in the manner described above. Photometric processing is performed utilizing a low-frequency component of the video signal obtained from the CCD 4 by preliminary imaging. Focusing control is performed utilizing a high-frequency component of this video signal.

In order to execute photometric processing, a $Y_L$ synthesizing circuit 15, a gate circuit 16 and an integrating circuit 17 are provided for the purpose of extracting low-frequency components of the video signal representing the image within a photometric area (described later) provided inside the photographic area of the CCD 4. The output from the b terminal of the changeover switch 14 is applied to the $Y_L$ synthesizing circuit 15.

In order to execute focusing control, on the other hand, a gate circuit 19, a band-pass filter (hereinafter referred to as a "BPF") 20, a detector circuit 21 and an integrating circuit 22 are provided for the purpose of extracting high-frequency components of the video signal representing the image within the rangefinding area (described later) provided inside the photographic area of the CCD 4. The output from the c terminal of the changeover switch 14 is applied to the gate circuit 19.

Actual photography is carried out after photometric processing, exposure control (control of the diaphragm and shutter) based upon photometric processing and focusing control (positioning of the image pick-up lens 24). At this time the changeover switch 14 is changed over in such a manner that the a output terminal is connected to the A/D converting circuit 13. By virtue of actual photography, the video signal obtained from the CCD 4 enters a controller 31 via the above-described circuits 7, 8, 9, 10, 11, 12, 13, whereby the video signal is stored temporarily in an image memory 32.

The digital image data that has been stored in the image memory 32 is read out and applied to Y/C processing circuit 33 by the controller 31, luminance (Y) delta and color (C) data are produced in the Y/C processing circuit 33, and the resulting data is stored again in the image memory 32.

The digital image data is read out of the image memory 32 and applied to a data compression circuit 34. The latter executes processing such as DCT (direct cosine transformation), Huffman coding or run-length coding to compress the input data. The compressed digital image data is recorded on the memory card 40.

As mentioned above, photometric processing (as exposure control based upon this processing) and focusing control are performed before actual photography. The photometric processing will be described first.

Photometric processing is executed using the $Y_L$ synthesizing circuit 15, gate circuit 16 and integrating circuit 17.

The CPU 3 outputs a window signal WIND1 for controlling the gate circuit 16 and a reset signal HLRST1 for resetting the integrating circuit 17. The timing of the signals WIND1 and HLRST1 will be described later.

The digital image data outputted by the analog/digital converting circuit 13 is applied to the $Y_L$ synthesizing circuit 15, which produces relatively low-frequency luminance data $Y_L$ (hereinafter referred to simply as a luminance data $Y_L$). The luminance data $Y_L$ passes through the gate circuit 16 for a length of time during which the window signal WIND1 is applied in the prescribed horizontal scanning interval. The integrating circuit 17 is reset when the reset signal HLRST 1 is applied, after which it integrates the luminance signal $Y_L$ entered from the gate 16. The integrated signal from the integrating circuit 17 is accepted by the CPU 3.

In photometric processing according to this embodiment, average photometry (AV photometry) for measuring average brightness within the field of view and spot photometry (SP photometry) for measuring brightness of the main subject within the field of view are performed. SP photometry is particularly useful in a case where the brightness of the main subject and the brightness of the background within the field of view differ and it is necessary to suitably set exposure conditions conforming to this difference.

Figure 2:
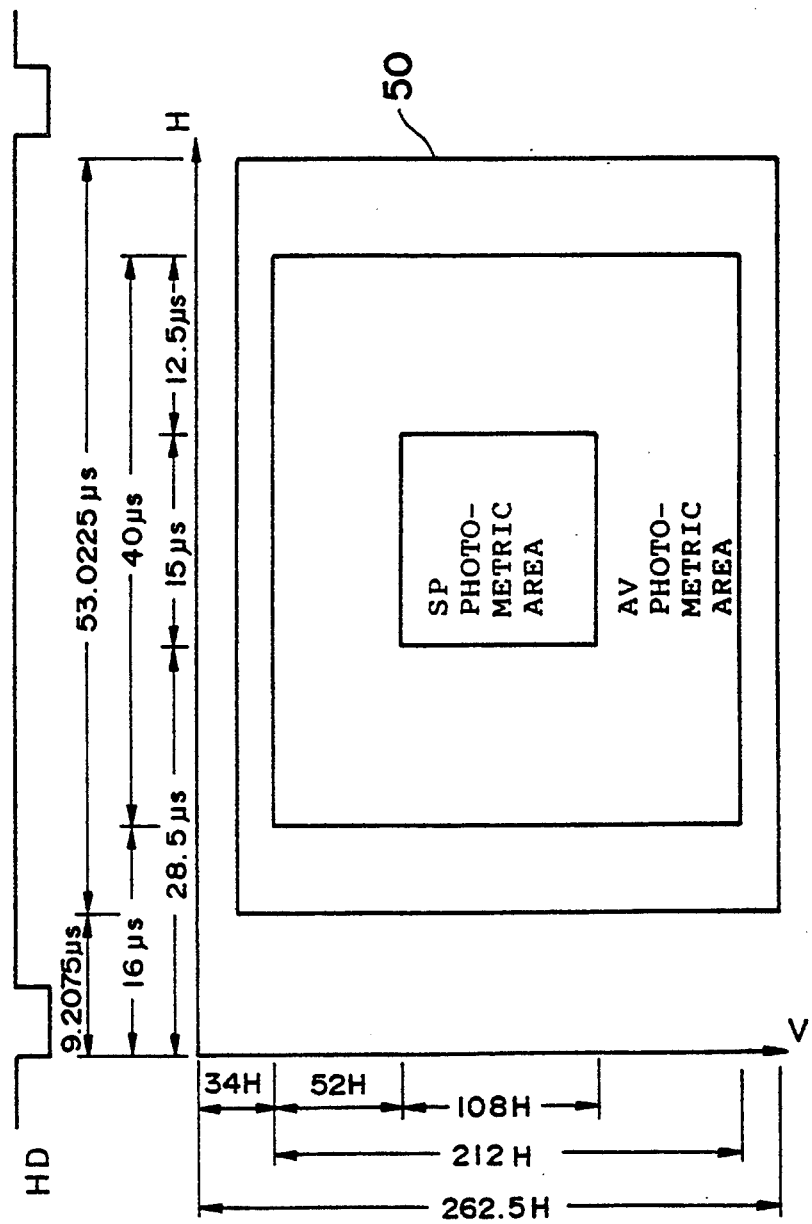
FIG. 2 is a diagram showing photometric areas set within a photographic area.

FIG. 2 illustrates an AV photometric area and an SP photometric area set in a photographic area 50 of the CCD 4.

The AV photometric area basically is set to cover substantially the entirety of the photographic area 50. In this embodiment, the AV photometric area is set in the horizontal direction to a time period of 40 μs that starts upon elapse of 16 μs from the leading edge of the horizontal synchronizing signal HD (i.e., from the moment at which the horizontal scanning interval starts) and, in the vertical direction, to an area from the 35th horizontal scanning line to the 246th horizontal scanning line.

The SP photometric area is set as a small area at any position within the photographic area 50. In this embodiment, the SP photometric area is set at the central portion of the photographic area 50. Further, in the horizontal direction, the SP photometric area is set to a time period of 15 μs that starts upon elapse of 28.5 μs from the leading edge of the horizontal synchronizing signal HD. In the vertical direction, the SP photometric area is set to an area from the 87th horizontal scanning line to the 194th horizontal scanning line.

Figure 3:
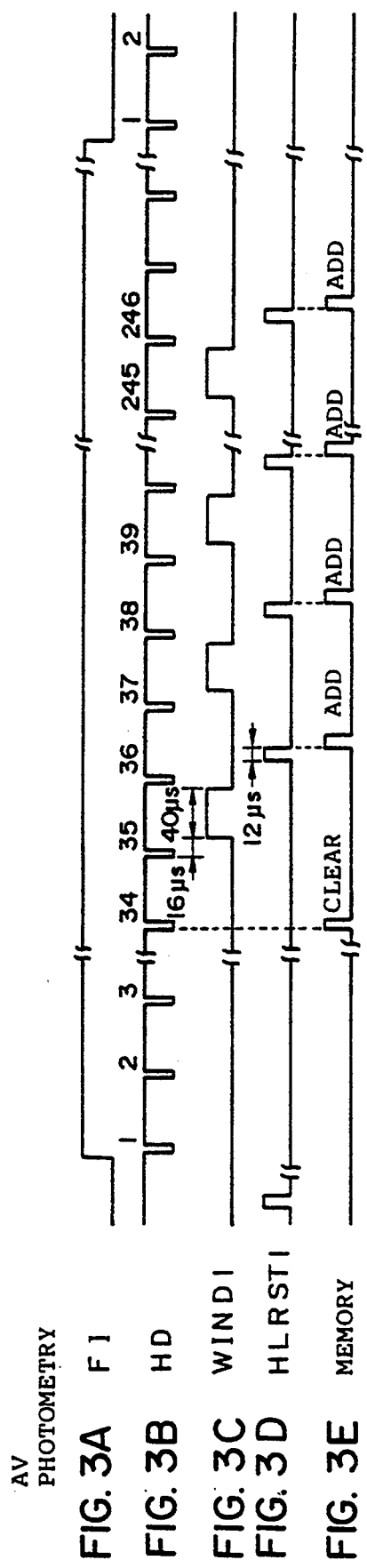
FIG. 3 is a time chart for a case in which average photometry is performed.

In AV photometry, as illustrated in FIG. 3, the window signal WIND1, which has a pulse width of 40 μs, is applied to the gate circuit 16 16 μs after the leading edge of the 35th horizontal synchronizing signal HD. During the time that the window signal WIND1 is being applied, the gate circuit 16 passes the entering luminance data $Y_L$ so that this data is fed into the integrating circuit 17.

The integrating circuit 17, which has been reset in the preceding field, integrates the luminance data $Y_L$ applied thereto through the gate circuit 16. When the window signal WIND1 reverts to the L level so that entry of the luminance data $Y_L$ to the integrating circuit 17 ceases, the integrated output of the integrating circuit 17 is held as is and this output is accepted by the CPU 3. The integrating circuit 17 is reset by the horizontal-line reset signal HLRST1, which is provided by the CPU 3, to prepare for the next integrating operation.

A storage area for the AV integrated data in a memory (e.g., a RAM) peripheral to the CPU 3 is cleared in synchronism with the 34th horizontal synchronizing signal HD. The integrated value of the digital data is added to the previous data (which will be zero in the case of the first operation owing to clearing) and the sum is stored in the storage area for the AV integrated data.

The resetting of the integrating circuit 17 and the processing for adding the integrated data are performed in the 36th horizontal scanning interval, which is the next interval.

Thus, as set forth above, the integration of the luminance data $Y_L$ by the integrating circuit 17 along one horizontal scanning line in the AV photometric area, the resetting of the integrating circuit 17 and the addition of the integrated data to the memory are repeatedly performed alternately every horizontal scanning interval. The repetition of these operations is performed up to the 246th horizontal scanning interval, namely over the entirety of the AV photometric area.

When SP photometry is carried out, the window signal WIND1, which has a pulse width of 15 μs, is applied to the gate circuit 16 28.5 μs after the leading edge of the 87th horizontal synchronizing signal HD. During the time that the window signal WIND1 is being applied, the integrating circuit 17 integrates the luminance data $Y_L$ applied thereto. The window signal WIND1 is applied every other horizontal scanning interval up to the 193rd horizontal scanning interval. The resetting of the integrating circuit 17 and the adding of the integrated data in the memory are performed in the next horizontal scanning interval of the integrating operation in the same manner as in the case of AV photometry described above.

It is preferred that the AV photometry and SP photometry be carried out alternately field by field or frame by frame.

Focusing control will be described next. When focusing control is carried out, changeover circuit 14 is switched to the c terminal.

With reference again to FIG. 1, it will be appreciated that the output data from the analog/digital converting circuit 13 enters the gate circuit 19. The latter is controlled by a window signal WIND2 provided by the CPU 3. The output data of the analog/digital converting circuit 13 enters the BPF 20 by being passed via the gate circuit 19 for the period of time that the window signal WIND2 is applied in the prescribed horizontal scanning interval.

The BPF 20, which extracts the high-frequency-component data necessary for focusing control from the input data, applies its output data to the detector circuit 21. The high-frequency-component data outputted by the BPF 20 is detected by the detector circuit 21, the detected data is integrated by the integrating circuit 22 and the resulting data is accepted by the CPU 3.

The digital data provided by the integrating circuit 22 is integrated data obtained by integration over the horizontal scanning interval of the rangefinding area, described below, set in the photographic area. The CPU 3 adds the integrated data over the vertical scanning interval of the rangefinding area, calculates data for rangefinding and performs focusing control based upon this data. The details will be described later.

In a case where the image is blurred because it is out of focus, generally there are few high-frequency components contained in the video signal obtained from the CCD 4 by photography. When the image is brought into focus, the high-frequency components of the video signal increase in number. The high-frequency components contained in the video signal are maximized at the position of correct focus. In this embodiment, focusing control is carried out on the basis of this fact, and the BPF 20 is set to a pass band of about 1.5~2.5 MHz in order to extract the high-frequency-component data of the digital image data.

Figure 4:
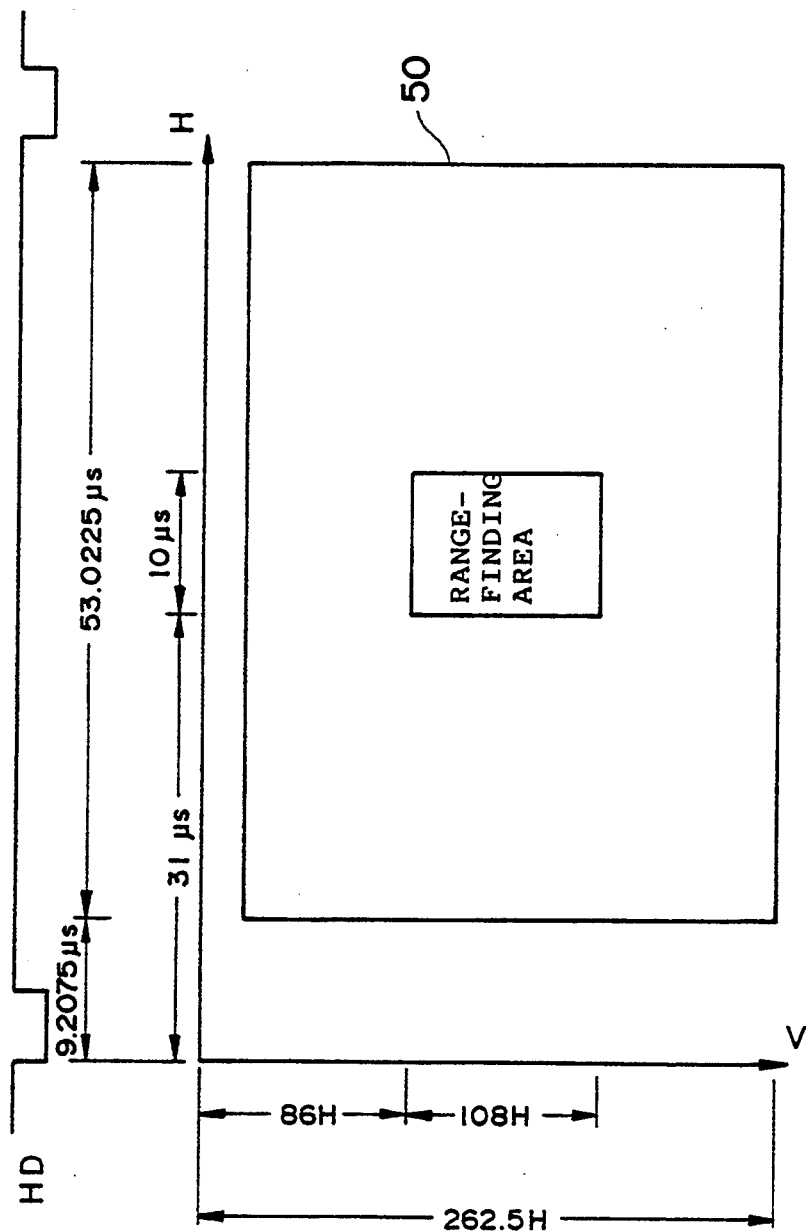
FIG. 4 is a diagram showing a rangefinding area set within a photographic area.

FIG. 4 is a diagram showing a rangefinding area set within the photographic area 50 of the CCD 4. The rangefinding area is set in the photographic area 50 at the central portion thereof, where the main subject is most likely to be present. In this embodiment, the rangefinding area is set as an area which, in terms of the horizontal direction, is smaller than the SP photometric area illustrated in FIG. 2. It goes without saying that the rangefinding area is capable of being set to have any width at any location in the photographic area 50.

Figure 5:
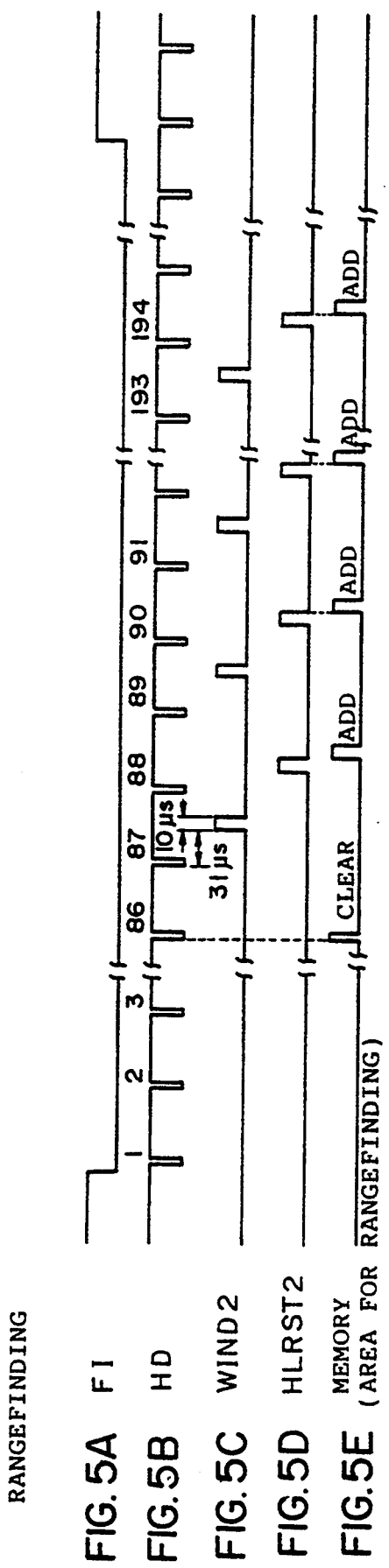
FIG. 5 is a time chart illustrating rangefinding processing.

In the time period of the B field, as illustrated in FIG. 5, the window signal WIND2, which has a pulse width of 10 μs, is applied to the gate circuit 19 31 μs after the leading edge of the 87th horizontal synchronizing signal HD. During the time that the window signal WIND2 is being applied, the gate circuit 19 passes the output signal of the circuit 13, as described earlier. The high-frequency-component data extracted by the BPF 20 is applied to the integrating circuit 22 via the detector circuit 21, and the integrated output data from the integrating circuit 22 is applied to the CPU 3. The integrating circuit 22 is reset by a reset signal HLRST2. The CPU 3 adds this digital data to the previous data (which will be zero in the case of the first operation owing to clearing) in the rangefinding area of the memory and stores the sum in this area. The rangefinding area of the memory is cleared in synchronism with the 86th horizontal synchronizing signal HD or at the beginning of the B field.

Thus, as set forth above, the detection of the high-frequency-component data by the BPF 20 along one horizontal scanning line in the rangefinding area and the detection and integration of this high-frequency-component data, and the addition of the integrated data in the next horizontal scanning interval are repeatedly performed alternately every horizontal scanning interval. The repetition of these operations is performed up to the 194th horizontal scanning interval, namely over the entirety of the rangefinding area.

Accordingly, at the moment scanning in the range finding area ends, the added data for rangefinding representing the integrated values over the entirety of the rangefinding area of the high-frequency data passed by the BPF 20 will have been stored in the rangefinding area of the memory.

In preliminary rangefinding using the rangefinding sensor 27, as mentioned above, the approximate distance to the subject is measured. On the basis of the preliminary rangefinding data, the image pick-up lens 24 is fed to a position (referred to as the "initial position") slightly short of a position considered to be that for correct focus.

The integrating operation, over the rangefinding area, of the high-frequency-component data in the digital image data is carried out at least six times (i.e., in the B-field interval of each frame interval over six frame intervals) while the image pick-up lens 24 is fed forward 10 μm at a time. First summed data for range-finding is obtained first at the aforesaid initial position (where the amount of feed of the image pick-up lens 24 is 0 μm). In the next frame interval, second summed data for rangefinding is obtained at a position (where the amount of feed of the image pick-up lens 24 is 10 μm) obtained by feeding the image pick-up lens 24 10 μm from the initial position. Third to sixth items of summed data for rangefinding are similarly obtained while feeding the image pick-up lens 24 10 μm at a time. The six items of summed data thus obtained are stored in a prescribed area of the memory, as illustrated in FIG. 6.

Figure 7:
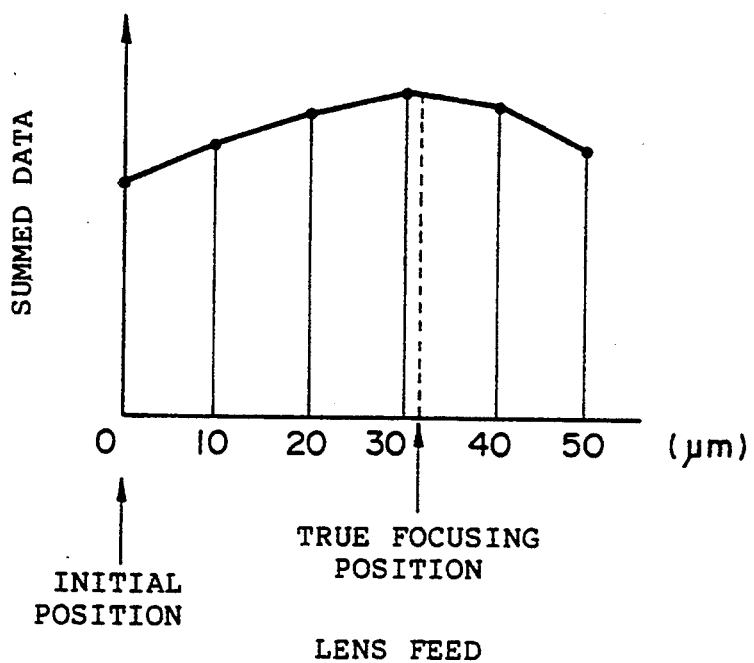
FIG. 7 is a graph showing addition data for rangefinding, this data being used for the purpose of focusing.

FIG. 7 is a graphical representation of the summed data for rangefinding at the six positions shown in FIG. 6. The initial position of the image pick-up lens 24 is slightly short of the true focused position. The image pick-up lens 24 is fed from this position 10 μm at a time to obtain the summed data for rangefinding at each position. The integrated value of the high-frequency data contained in the digital image data becomes maximum at the true focused position. Since the unit amount of feed of the image pick-up lens 24 is 10 μm, which is a very minute distance, the error will be extremely small even if the position at which the summed data for rangefinding indicates the maximum value is regarded as the true focused position. Accordingly, highly precise focusing can be achieved by positioning the image pickup lens 24 at the position at which the summed data for rangefinding indicates the maximum value.

Figure 8:
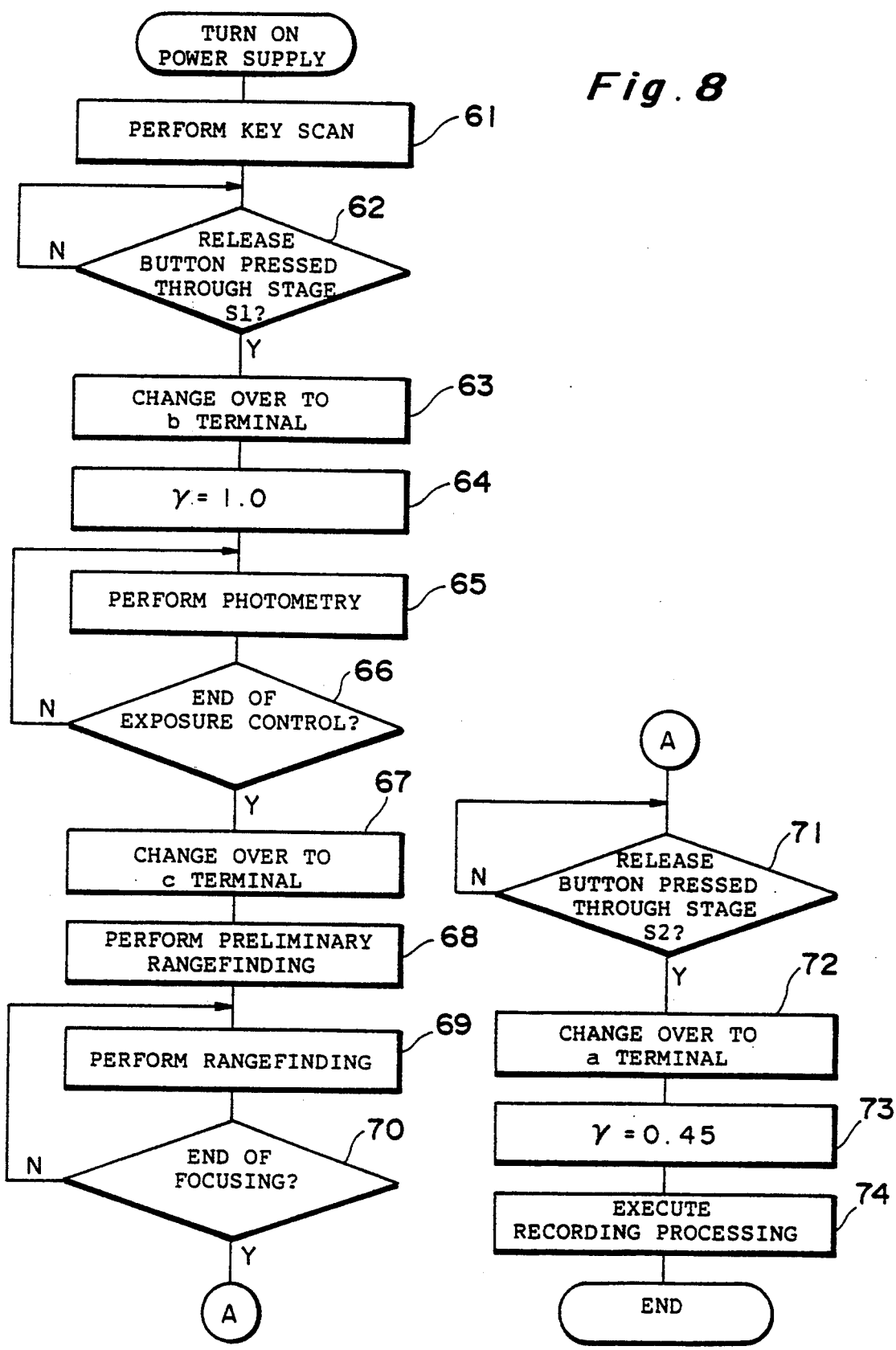
FIG. 8 is a flowchart illustrating the overall procedure of photographic processing.

FIG. 8 illustrates the overall operation of recording processing in a digital still-video camera.

When a power-supply switch (not shown) of the digital still-video camera is turned on, various set modes of the camera are discriminated (step 61).

Next, it is determined whether the shutter release button 26 has been pressed through the first stage of its stroke (step 62). If the shutter release button 26 has been pressed through the first stage of its stroke (YES at step 62), the changeover switch 14 is controlled in such a manner that the b terminal of the switch 14 is in order that photometric processing may be performed (step 63).

In a case where photometric-control processing and focusing-control processing are executed based upon the digital image data, it is preferred that a gamma correction not be performed in order that highly precise control may be carried out. Accordingly, when exposure control and focusing control are performed, the gamma-corrector circuit 10 is controlled by the CPU 3 so as to employ the proportional characteristic (step 64).

Next, in the manner described above, the luminance data is extracted by the $Y_L$ synthesizing circuit 15 from the image data outputted by the analog/digital converting circuit 13, the luminance data is applied to the CPU 3 via the circuits 16 and 17, and the luminance of the subject is measured (step 65). The f-stop of the diaphragm (not shown) and the shutter speed are controlled based upon the measured luminance of the subject in such a manner that an appropriate amount of exposure is attained.

When processing for photometric control is concluded (YES at step 66), rangefinding processing is executed.

First, control is performed by the CPU 3 in such a manner that the terminal c of the changeover switch 14 is connected to A/D converting circuit 13 (step 67). Next, preliminary rangefinding based upon the rangefinding sensor 27 is performed (step 68) so that the image pick-up lens is fed to the initial position.

When the image pick-up lens 24 is fed to the initial position, the high-frequency-component data is extracted from the image data, which is outputted by the analog/digital converting circuit 13, by the BPF 20 through the gate circuit 19, the extracted data is applied to the CPU 3 via the circuits 21 and 22 and accurate positioning of the image pick-up lens 24 is carried out (step 69) in the manner described earlier.

When focusing control is concluded (YES at step 70), the camera enters a standby mode of operation until the shutter release button 26 is pressed through the second stage of its stroke.

When the shutter release button 26 is pressed through the second stage of its stroke by the photographer (YES at step 71), a transition is made to recording processing.

In recording processing, the changeover switch 14 is controlled so as to connect the terminal a with the A/D converting circuit 13 (step 72). As a result, the output data from the analog/digital converting circuit 13 is applied to the circuitry of recording system.

Further, the gamma-corrector circuit 10 is controlled in such a manner that the value of the output signal will be the value of the input signal raised to the 0.45 power so as to establish a characteristic that is the inverse of the display characteristic of a television (step 73).

Next, recording processing is executed (step 73) and the image data representing the subject is applied to the controller 31 via the CCD 4 and the circuits 7, 8, 9, 10, 11, 12 and 13. Data compression processing is applied in the data compression circuit 34 via the image memory 32 and Y/C processing circuit 33, and the resulting data is recorded on the memory card 40.

In the described given above, the gamma-corrector circuit 10 is an analog circuit. However, the gamma correction can be performed digitally by using a look-up table. Further, an analog/digital converting circuit can be connected in back of the correlated double-sampling circuit 7 and subsequent processing can be executed digitally.

As many apparently widely different embodiments of the present invention can be made without departing from the spirit and scope thereof, it is to be understood that the invention is not limited to the specific embodiments thereof except as defined in the appended claims.

What is claimed is:

1. A digital electronic still-video camera having an image pick-up optical system which includes a solid-state electronic image sensing device for converting an incident light image into an analog video signal and outputting the analog video signal, comprising:

a shutter release means for performing exposure control and focusing control in response to depression of a shutter release button through a first stage of a stroke and for photographic recording in response to pressing the shutter release button through a second stage of the stroke;

a gamma-corrector circuit means, which is capable of being changed over between a gamma correction characteristic and a linearly proportional characteristic, for outputting a signal obtained by making whichever of these characteristics is selected, in dependence upon an applied control signal, act upon the analog video signal outputted by the solid-state electronic image sensing device;

an analog/digital converting circuit means for converting the analog video signal, which is outputted by said gamma-corrector circuit, into digital image data;

photometric-value calculating means for extracting luminance-related data from the digital image data outputted by said analog-digital converting circuit and calculating a photometric value based upon the luminance-related data extracted in response to depression of the shutter release button through said first stage;

recording means for subjecting the digital image data, which is outputted by said analog/digital converting circuit, to recording processing and then recording the digital image data on a recording medium in response to depression of the shutter release button through said second stage; and changeover control means for applying a control signal to said gamma-corrector circuit in such a manner that the gamma-correction characteristic is made to act in said gamma-corrector circuit when the digital image data is recorded on the recording medium and the linearly proportional characteristic is made to act in said gamma-corrector circuit when photometric processing of a subject is executed.

2. A digital electronic still-video camera having an image pick-up lens and a solid-state electronic image sensing device for converting a light image incident through the image pick-up lens into an analog video signal and outputting the analog video signal, comprising:

a shutter release means for performing exposure control and focusing control in response to depression of a shutter release button through a first stage of a stroke and for photographic recording in response to pressing the shutter release button through a second stage of the stroke;

a gamma-corrector circuit means, which is capable of being changed over between a gamma correction characteristic and a linearly proportional characteristic, for outputting a signal obtained by making whichever of these characteristics is selected, in dependence upon an applied control signal, act upon the analog video signal outputted by the solid-state electronic image sensing device;

an analog/digital converting circuit means for converting the analog video signal, which is outputted by said gamma-corrector circuit, into digital image data;

focusing-control means for extracting high-frequency-component data for focusing control from the digital image data outputted by said analog/digital converting circuit and performing focusing control of the image pick-up lens based upon the high-frequency-component data extracted in response to depression of the shutter release button through said first stage; and recording means for subjecting the digital image data, which is outputted by said analog/digital converting circuit, to recording processing and then recording the digital image data on a recording medium in response to depression of the shutter release button through said second stage;

changeover control means for applying a control signal to said gamma-corrector circuit in such a manner that the gamma-correction characteristic is made to act in said gamma-corrector circuit when the digital image data is recorded on the recording medium and the linearly proportional characteristic is made to act in said gamma-corrector circuit when focusing control of the image pick-up lens is performed.

3. The camera according to claim 2, further comprising photometric-value calculating means for extracting luminance-related data from the digital image data outputted by said analog/digital converting circuit and calculating a photometric value based upon the luminance-related data extracted;

said changeover control means applying a control signal to said gamma-corrector circuit in such a manner that the linearly proportional characteristic is made to act in said gamma-corrector circuit also when photometric processing of a subject is executed in addition to when focusing control of the image pick-up lens is performed.

4. In a digital electronic still-video camera having an image pick-up optical system which includes a solid-state electronic image sensing device for converting an incident light image into an analog video signal and outputting the analog video signal, a gamma-corrector circuit for applying a gamma correction to the analog video signal outputted by the solid-state electronic image sensing device, and a shutter release mechanism for performing exposure control and focusing control in response to depression of a shutter release button through a first stage of a stroke and for photographic recording in response to pressing the shutter release button through a second stage of the stroke, a method of controlling said digital electronic still-video camera comprising the steps of:

enabling said gamma-corrector circuit to be changed over between a gamma-correction characteristic and a linearly proportional characteristic;

controlling changeover of said gamma-corrector circuit in such a manner that the characteristic of said gamma-corrector circuit is changed over to the linearly proportional characteristic when photometric processing of a subject is executed, converting the analog video signal outputted by said gamma-corrector circuit into digital image data using said analog/digital converting circuit, extracting luminance-related data from this digital image data, and calculating a photometric value based upon the luminance-related data extracted;

controlling changeover of said gamma-corrector circuit in such a manner that the characteristic of said gamma-corrector circuit is changed over to the gamma-correction characteristic when digital image data is recorded on the recording medium, converting the analog video signal that is gamma-corrected by the gamma-correction characteristic into digital image data using an analog/digital converting circuit, subjecting this digital image data to recording processing and then recording the digital image data on the recording medium.

5. In a digital electronic still-video camera having an image pick-up optical system which includes an image pick-up lens and a solid-state electronic image sensing device for converting a light image incident through the image pick-up lens into an analog video signal and outputting the analog video signal, a gamma-corrector circuit for applying a gamma correction to the analog video signal outputted by the solid-state electronic image sensing device, and a shutter release mechanism for performing exposure control and focusing control in response to depression of a shutter release button through a first stage of a stroke and for photographic recording in response to pressing the shutter release button through a second stage of the stroke, a method of controlling said digital electronic still-video camera comprising the steps of:

enabling said gamma-corrector circuit to be changed over between a gamma-correction characteristic and a proportional characteristic;

controlling changeover of said gamma-corrector circuit in such a manner that the characteristic of said gamma-corrector circuit is changed over to the proportional characteristic when focusing control of the image pick-up lens is performed in response to depression of the shutter release button through said first stage, converting the analog video signal outputted by said gamma-corrector circuit into digital image data using said analog/digital converting circuit, extraction high-frequency-component data for focusing control from this digital image data, and performing the focusing control of the image pick-up lens based upon the high-frequency-component data extracted.

6. The method according to claim 5, further comprising the step of controlling changeover of said gamma-corrector circuit in such a manner that the characteristic of said gamma-corrector circuit is changed over to the linearly proportional characteristic when photometric processing of a subject is performed, converting the analog video signal outputted by said gamma-corrector circuit into digital image data using said analog/digital converting circuit, extracting luminance-related data from this digital image data, and calculating a photometric value based upon the luminance-related data extracted.

7. A digital electronic still-video camera having an image pick-up optical system which includes a solid-state electronic image sensing device for converting an incident light image into an analog video signal and outputting the analog video signal, comprising:

a shutter release means for performing exposure control and focusing control in response to depression of a shutter release button through a first stage of a stroke and for photographic recording in response to pressing the shutter release button through a second stage of the stroke;

an analog/digital converting circuit means for converting the analog video signal, which is outputted by said solid-state electronic image sensing device, into digital image data;

a gamma-corrector circuit means, which is capable of being changed over between a gamma correction characteristic and a linearly proportional characteristic, for outputting data obtained by making whichever of these characteristics is selected, in dependence upon an applied control signal, act upon the digital image data outputted by the analog/digital converting circuit;

recording means for subjecting the digital image data, which is outputted by said gamma-corrector circuit, to recording processing and then recording the digital image data on a recording medium;

photometric-value calculating means for extracting luminance-related data from the digital image data outputted by said gamma-corrector circuit and calculating a photometric value based upon the luminance-related data extracted; and changeover control means for applying a control signal to said gamma-corrector circuit in such a manner that the linearly proportional characteristic is made to act in said gamma-corrector circuit when photometric processing of a subject is executed in response to depression of the shutter release button through said first stage, and the gamma-correction characteristic is made to act in said gamma-corrector circuit when the digital image data is recorded on the recording medium in response to depression of the shutter release button through said second stage.

8. A digital electronic still-video camera having an image pick-up lens and a solid-state electronic image sensing device for converting a light image incident through the image pick-up lens into an analog video signal and outputting the analog video signal, comprising:

a shutter release means for performing exposure control and focusing control in response to depression of a shutter release button through a first stage of a stroke and for photographic recording in response to pressing the shutter release button through a second stage of the stroke;

an analog/digital converting circuit for converting the analog video signal, which is outputted by said solid-state electronic image sensing device, into digital image data;

a gamma-corrector circuit, which is capable of being changed over between a gamma correction characteristic and a linearly proportional characteristic, for outputting data obtained by making whichever of these characteristics is selected, in dependence upon an applied control signal, act upon the digital image data outputted by the analog/digital converting circuit;

recording means for subjecting the digital image data, which is outputted by said gamma-corrector circuit, to recording processing and then recording the digital image data on a recording medium;

focusing-control means for extracting high-frequency-component data for focusing control from the digital image data outputted by said gamma-corrector circuit and performing focusing control of the image pick-up lens in response to depression of the shutter release button through said first stage based upon the high-frequency-component data extracted; and changeover control means for applying a control signal to said gamma-corrector circuit in such a manner that the linearly proportional characteristic is made to act in said gamma-corrector circuit when focusing control of the image pick-up lens is performed in response to depression of the shutter release button through said first stage, and the gamma-correction characteristic is made to act in said gamma-corrector circuit when the digital image data is recorded on the recording medium in response to depression of the shutter release button through said second stage.

9. The camera according to claim 8, further comprising photometric-value calculating means for extracting luminance-related data from the digital image data outputted by said gamma-corrector circuit and calculating a photometric value based upon the luminance-related data extracted;

said changeover control means applying a control signal to said gamma-corrector circuit is such a manner that the linearly proportional characteristic is made to act in said gamma-corrector circuit also when photometric processing of a subject is executed in addition to when focusing control of the image pick-up lens is performed.

* * * * *